United States Patent Office 3,026,319
Patented Mar. 20, 1962

3,026,319
NEW SULFONAMIDES AND METHOD FOR PREPARING SAME
Jean Druey, Riehen, and Hans Isler, Bottmingen, Switzerland, assignors to Ciba Pharmaceutical Products Inc., Summit, N.J.
No Drawing. Filed June 13, 1958, Ser. No. 741,719
Claims priority, application Switzerland July 18, 1957
3 Claims. (Cl. 260—239.7)

This invention provides as new compounds 3-(para-aminobenzene-sulfonamido)-6-lower alkyl sulfonyl-pyridazines of the formula

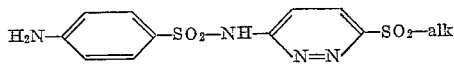

in which "alk" represents a lower alkyl radical, and salts thereof, for example, their alkali metal and alkaline earth metal salts, and especially their sodium salts, magnesium salts and aluminum salts. As lower alkyl radicals there come into consideration ethyl, propyl, butyl or amyl radicals which may be straight chained or branched, but more especially methyl.

The new compounds have valuable therapeutic properties. They are chemotherapeutically active, for example, in tests on animals, for example, mice which are experimentally infected with cocci or E. coli. They are useful as medicaments, for example, in coccal infections or intestinal infections. The new sulfonamides are distinguished by a good urine-disinfecting effect.

The new compounds can be made by methods in themselves known. Thus, for example, in a compound of the formula

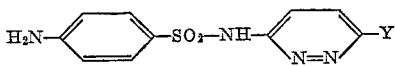

in which Y represents a substituent convertible into a lower alkyl sulfonyl group, the latter substituent is so converted.

A substituent convertible into a lower alkyl sulfonyl group is, for example, a reactive esterified hydroxyl group, especially a halogen atom and particularly chlorine or bromine, which can be converted into the lower alkyl sulfonyl group by reaction with a lower alkane sulfinic acid, especially methane sulfinic acid. For the latter reaction the alkane sulfinic acid is advantageously used in the form of a metal salt, such as an alkali metal or alkaline earth metal salt, thereof.

Therapeutically useful metal salts of the new sulfonamides can be made in the usual manner, for example, by reacting them with a base, such as an alkali metal hydroxide or alkaline earth metal hydroxide or an organic base or by double decomposition of a salt thereof with an appropriate salt of the desired metal, e.g. aluminum sulfate.

The starting materials are known or can be made by methods in themselves known.

The new sulfonamides can be used as medicaments, for example, in the form of pharmaceutical preparations. These preparations contain the new compound, if desired, in the form of a salt thereof, in admixture with a pharmaceutical organic or inorganic carrier suitable for enteral, parenteral or local administration. For making the carriers there are used substances that do not react with the new compounds, for example, water, gelatine, lactose, starches, magnesium stearate, talc, vegetable oils, benzyl alcohols, gums, polyalkylene glycols, white petroleum jelly, cholesterol or other known carrier for medicaments. The pharmaceutical preparations may be, for example, in the form of tablets, dragees, powders, salves, creams or suppositories or in liquid form as solutions, suspensions or emulsions. If desired they may be sterilized and/or may contain auxiliary substances, such as preserving, stabilizing, wetting or emulsifying agents. They may also contain other therapeutically valuable substances.

The following example illustrates the invention:

*Example*

25.5 grams of 3-(para-aminobenzene-sulfonamido)-6-chloropyridazine, 10.8 grams of sodium methane sulfinate and 340 cc. of methanol are heated in a closed tube for 6 hours at 135–140° C. The undissolved matter is then filtered off, and the methanol is evaporated under reduced pressure produced by a water jet pump. The residue is taken up in 300 cc. of a 1N-solution of caustic soda, the solution is filtered through animal charcoal, the filtrate is acidified with 240 cc. of 2N-acetic acid and the precipitate is filtered off with suction. The latter is crystallized from 500 cc. of 2N-acetic acid.

The 3-(para-aminobenzene-sulfonamido)-6-methyl sulfonyl-pyridazine so obtained melts at 196–199° C.

What is claimed is:
1. A member of the group consisting of 3-(para-aminobenzene-sulfonamido)-6-lower alkyl sulfonyl-pyridazines of the formula

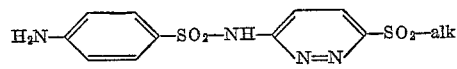

in which "alk" represents a lower alkyl radical, and their therapeutically useful alkali and alkaline earth metal salts.
2. 3 - (para - aminobenzene - sulfonamide) - 6 - methylsulfonyl-pyridazine.
3. A therapeutically useful salt of 3-(para-aminobenzene-sulfonamido)-6-methyl-sulfonyl-pyridazine, said salt being selected from the group consisting of an alkali and an alkaline earth metal salt.

References Cited in the file of this patent
UNITED STATES PATENTS
2,494,524     Sprague _____ Jan. 10, 1958
FOREIGN PATENTS
1958/57     South Africa _____ June 29, 1957
OTHER REFERENCES
Richter's Organic Chemistry, vol. 1, 3rd ed., Elsevier Pub. Co., New York, pages 174–175 (1934).
Northey: "The Sulfonamides and Allied Compounds," Reinhold Pub. Co., New York, page 177 (1948).
Gregory et al.: J. Chem. Soc., 1949, pages 2066–69 (part III).